United States Patent
Amsterdam et al.

(10) Patent No.: US 7,870,074 B2
(45) Date of Patent: Jan. 11, 2011

(54) DYNAMIC TRANSFERRING OF AVATARS BETWEEN VIRTUAL UNIVERSES

(75) Inventors: Jeffrey D. Amsterdam, Marietta, GA (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 12/120,308

(22) Filed: May 14, 2008

(65) Prior Publication Data

US 2009/0287614 A1 Nov. 19, 2009

(51) Int. Cl.
*G06F 21/00* (2006.01)
(52) U.S. Cl. .................... 705/51; 705/26; 718/104; 718/105
(58) Field of Classification Search ............... 705/51
See application file for complete search history.

(56) References Cited

U.S. PATENT DOCUMENTS 5,956,038 A * 9/1999 Rekimoto .............. 345/419
6,226,669 B1 * 5/2001 Huang et al. .............. 709/204
7,177,952 B1 2/2007 Wurch et al.
2006/0031578 A1 2/2006 Pelletier
2006/0056446 A1 3/2006 Lee et al.
2007/0087820 A1 * 4/2007 Van Luchene et al. ........ 463/25
2007/0099685 A1 * 5/2007 Van Luchene .............. 463/1
2007/0111770 A1 * 5/2007 Van Luchene .............. 463/7
2007/0256059 A1 11/2007 Sullivan et al.
2007/0294171 A1 * 12/2007 Sprunk ..................... 705/50
2008/0091692 A1 * 4/2008 Keith et al. ................ 707/100

OTHER PUBLICATIONS

"What is MMORPG?" (dated Apr. 28, 2007). Wisegeek.com. All pages. [Retrieved via Wayback machine on Jan. 8, 2010.]*
Bartle, R. Designing Virtual Worlds. New Riders. Jul. 15, 2003. All pages.*

* cited by examiner

*Primary Examiner*—Evens J Augustin
*Assistant Examiner*—Calvin K Cheung
(74) *Attorney, Agent, or Firm*—DeLizio Gilliam, PLLC

(57) ABSTRACT

Interruption and degradation of service within a virtual universe leads to an unsatisfactory experience for users of the virtual universe. Dissatisfaction with service of a virtual universe may lead users to see alternate universes providing higher levels of service. Functionality can be implemented to identify alternate virtual universes that meet a user's service requirements and dynamically move the user's avatar from one virtual universe to another.

19 Claims, 4 Drawing Sheets

DYNAMIC TRANSFERRING OF AVATARS BETWEEN VIRTUAL UNIVERSES

BACKGROUND

Embodiments of the inventive subject matter generally relate to the field of virtual universe systems, and, more particularly, to dynamic transferring of avatars between virtual universes.

Virtual universe applications allow people to socialize and interact in a virtual universe. A virtual universe (VU) is a computer-based simulated environment intended for its residents to traverse, inhabit, and interact through the use of avatars. Many VUs are represented using 3-D graphics and landscapes, and are populated by many thousands of users, known as residents. Other terms for VUs include metaverses and "3D Internet."

A virtual universe server may support a limited number of avatars and objects. As virtual universes continue to grow and the number of users within them increases, users may experience interruption or degradation of services within these environments. Interruption and degradation may be caused by poor network performance, server congestion, spam, and unwelcome avatar behavior and security breaches, all of which degrade a user's experience.

SUMMARY

Embodiments include a method directed to evaluating performance metrics of a plurality of virtual universes against one or more indicated performance metric constraints. A first virtual universe is selected from the plurality of virtual universes based, at least in part, on evaluating the one or more performance metrics of the plurality of virtual universes against the one or more indicated performance metric constraints. An avatar is transferred from a current virtual universe to the first virtual universe.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to virtual universes, embodiments can be implemented in massive multiplayer online role-playing games (MMORPG). In other instances, well-known instruction instances, protocols, structures and techniques have not been shown in detail in order not to obfuscate the description.

Interruption and degradation of service within a virtual universe leads to an unsatisfactory experience for users of the virtual universe. Dissatisfaction with service of a virtual universe may lead users to seek alternate universes providing higher levels of service. Functionality can be implemented to identify alternate virtual universes that meet a user's service requirements and dynamically move the user's avatar from one virtual universe to another.

In the following description, some examples refer to performance metrics. Examples of performance metrics include availability, responsiveness, usage fees, incidence of spam, level of security, avatar density, ease of navigation, etc. Availability of a virtual universe refers to the ability to reach the VU on a network, acceptance of new avatars into the VU, and being able to login to the VU. Responsiveness of a virtual universe refers to bandwidth allocated to the VU and time to perform routine tasks, such as rendering objects, animating objects, teleporting avatars, etc. Usage fees are the monthly cost paid by the user to access the virtual universe. Incidence of spam refers to unsolicited instant messages and/or emails received by avatars in the virtual universe. The level of security of a VU is determined by the privacy policy and encryption methods used for transactions within the VU. Avatar density is at least one of the total number of avatars that exist in the VU, the typical number of avatars logged into the VU at a time, and the number of active avatars in the VU (i.e., avatars that have logged in within the last month). Ease of navigation refers to the presence of clear signs with large fonts, multilingual support, etc.

Figure 1:
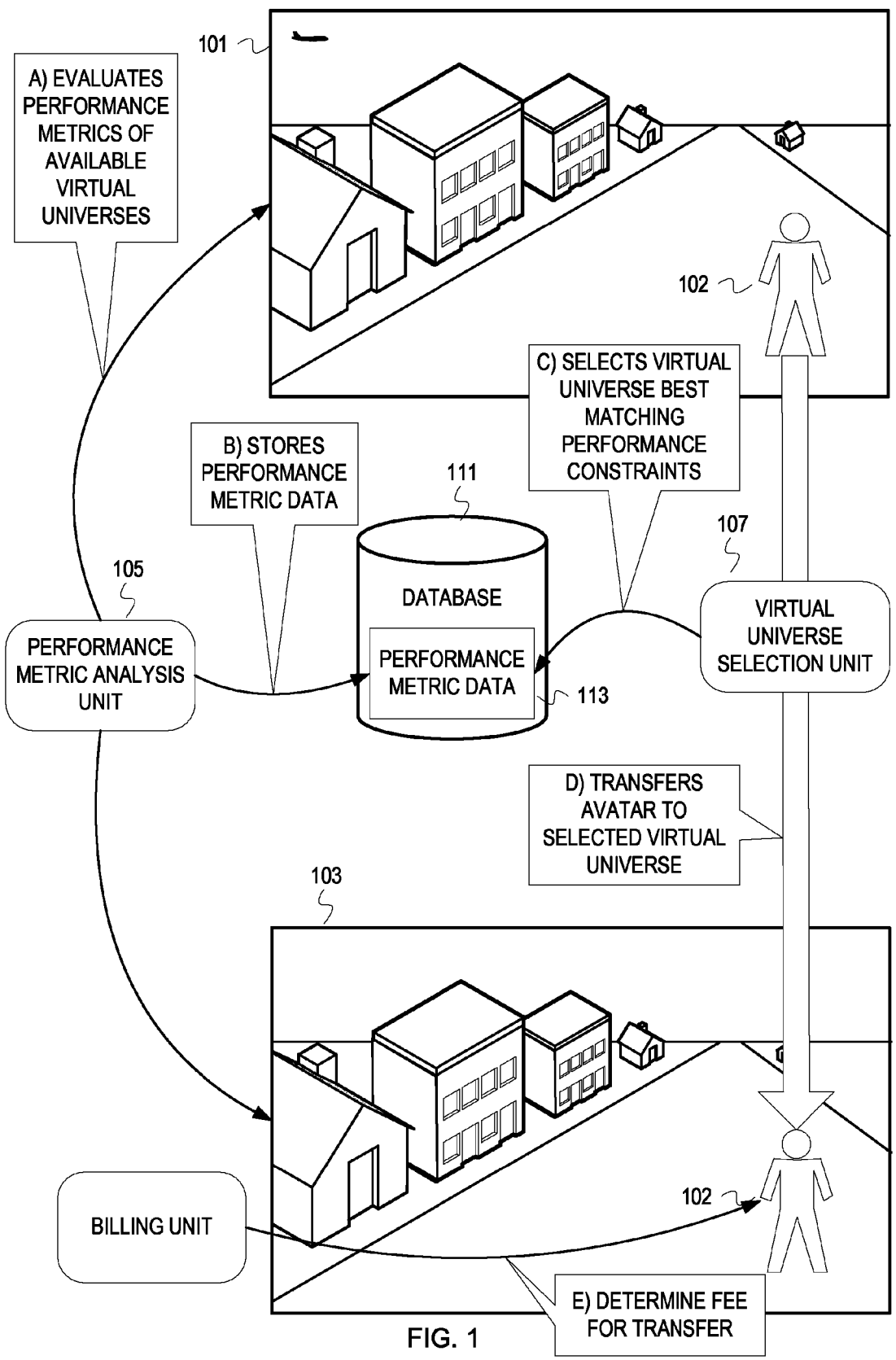
FIG. 1 depicts an example of switching an avatar from one virtual universe to another virtual universe.

FIG. 1 depicts an example of switching an avatar from one virtual universe to another virtual universe. Virtual universes 101 and 103 exist in a plurality of virtual universes. Avatar 102 is instantiated in virtual universe 101. At stage A, a performance metric analysis unit 105 evaluates one or more performance metrics of available virtual universes. Performance metrics may be current or predicted values. Performance metric predictions are based on one or more of past performance metrics, virtual universe growth (e.g., number of avatars added over certain periods of time), server load, etc. In addition, different weights can be applied to different performance metrics. At stage B, the performance metric analysis unit 105 stores performance metric data 113 in a database 111. The database 111 may exist on a server hosting one or more virtual universes, on a third party server, etc.

At stage C, a virtual universe selection unit 107 selects a second virtual universe 103 satisfying to some degree indicated performance constraints. Performance constraints can be indicated by a user and are associated with the user's avatar. Embodiments can also dynamically generate performance constraints based on one or more of a user profile, avatar history, network congestion, server load, etc., as well as read performance constraints from a configuration file, clone performance constraints from other accounts, etc. Constraints can be specified for one or more of the performance metrics. Different weights can be associated with performance constraints based on user or default configurations. Some embodiments may use predicted performance metrics to determine if the indicated performance metric constraints can be sustained over a certain period of time. At stage D, the virtual universe selection unit 107, transfers the avatar 102 from VU 101 to VU 103.

At stage E, a billing unit determines a transfer fee for the transfer of the avatar 102 to the second virtual universe 103. The transfer fee can be based, at least in part, on the number of transfers previously requested for the avatar and/or account associated with the avatar, the difference(s) between the source and destination virtual universes, the destination virtual universe itself, amount of inventory of the avatar, number of avatars associated with the user account associated with the avatar being transferred, whether all avatars are to be transferred, etc. Fees may be based on different levels of service. For example, a user may pay more to set their own performance metric constraints than accepting recommended constraints. As another example, fees may be determined by the performance improvement experience by a user. As another example, a flat monthly fee to use a transfer service may be charged over time. In addition, it may be determined that a fee will not be charged. For example, a promotion may provide a free avatar transfer for a first time user. Alternatively, fees may be paid by VU owners rather than users if the method is seen as a service provider's means of alleviating congestion on their servers. In such an embodiment, the performance constraints may be agreed to and imposed by the VU owners rather than allowing users a choice. This would prevent fraudulent activity such as a second VU owner creating accounts in a first VU with constraints designed to trigger frequent transfer with corresponding payment to the second VU owner.

Figure 2:
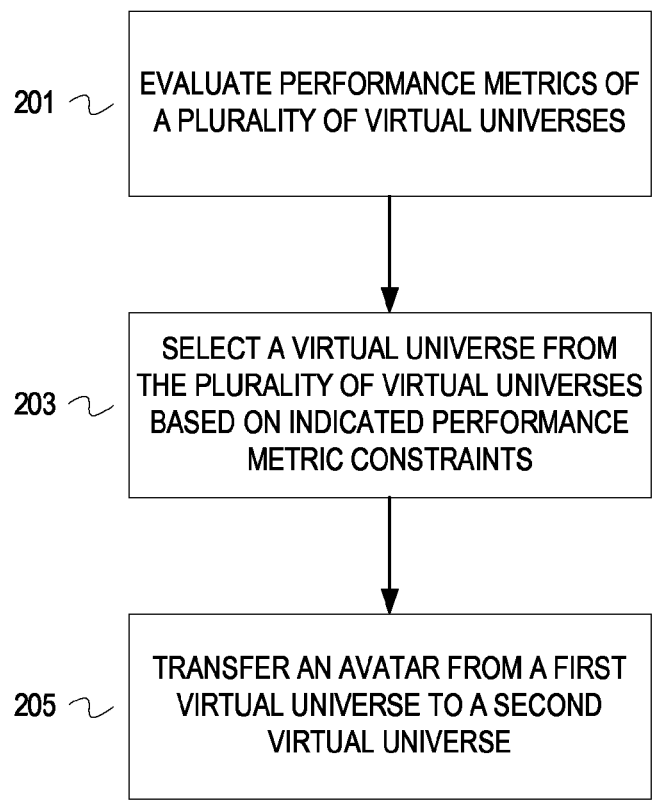
FIG. 2 is a flowchart depicting example operations to transfer an avatar from a first virtual universe to a second virtual universe.

FIG. 2 is a flowchart depicting example operations to transfer an avatar from a first virtual universe to a second virtual universe. Flow begins at block 201, where performance metrics of a plurality of virtual universes are evaluated against one or more indicated performance metric constraints. The performance metric data may be collected by a virtual universe service provider or an outside switching service. Sources of performance metric data may include user reported data, data reported by a virtual universe, third party measurements, etc.

At block 203, a second virtual universe is selected from the plurality of virtual universes based on the indicated performance metric constraints. The performance metric data of the selected virtual universe is the one of the plurality of virtual universes that satisfies the indicated performance metric constraints to the greatest degree, perhaps with application of one or more weights associated with the constraints. For example, a user has indicated a preference for his or her avatar to reside in a VU with a low incidence of spam. A virtual universe with the lowest level of spam received by avatars is selected. As another example, indicated performance constraints may be lowest level of spam, highest population of frequently visiting avatars, and a given range of acceptable packet delay time. Greater weights can be applied to the performance constraints of lowest level of spam and highest population of frequently visiting avatars than packet delay time. Note that performance constraints can be compound constraints. For example, a performance constraint of highest population of frequently visiting avatars can involve determining population of virtual universes and a mean or media time between visits to the virtual universe.

At block 205, an avatar is transferred from a first virtual universe to a second virtual universe. The first VU is the VU in which the avatar is currently residing. The second VU is the VU selected based on indicated performance metrics. In some embodiments, transferring an avatar to a second VU may involve creating a new account on the server of the second VU by copying data existing in the avatar's account on the server of the first VU. In other embodiments, the transfer involves changing a server or VU identifier associated with the avatar's account because the first and second VUs share a common user database.

When the avatar is transferred to the second VU, state information is maintained. State information may include the avatar's inventory, transaction data, VU real estate holdings, etc. In addition, the plurality of VUs may be analyzed based on compatibility with the first VU. In some embodiments, state data is replicated on the server of the second VU similar to copying the avatar's account data to the server. In other embodiments, state data that exists in a common user database is merely analyzed for compatibility.

In some cases, full state information may not be maintained during the transfer to the second virtual universe because of incompatibilities or conflicts between the first and second virtual universes. Examples of incompatibilities between virtual universes include different numbers of items that can be stored in inventory, different maps or landscapes, different currencies, etc. When a transfer may result in lost state data, the user is notified of the potential loss and can choose not to continue with the transfer. Additionally, options may be presented to resolve the loss of state information. For example, an avatar owns a house in a first VU that cannot be replicated into a second VU. Options to resolve the incompatibility may include offering a sum of money for the house in the first VU to allow the user to buy another property in the second VU, trading the house in the first VU for a similar property in the second VU, allowing the user to build a house in the second VU, etc.

Figure 3:
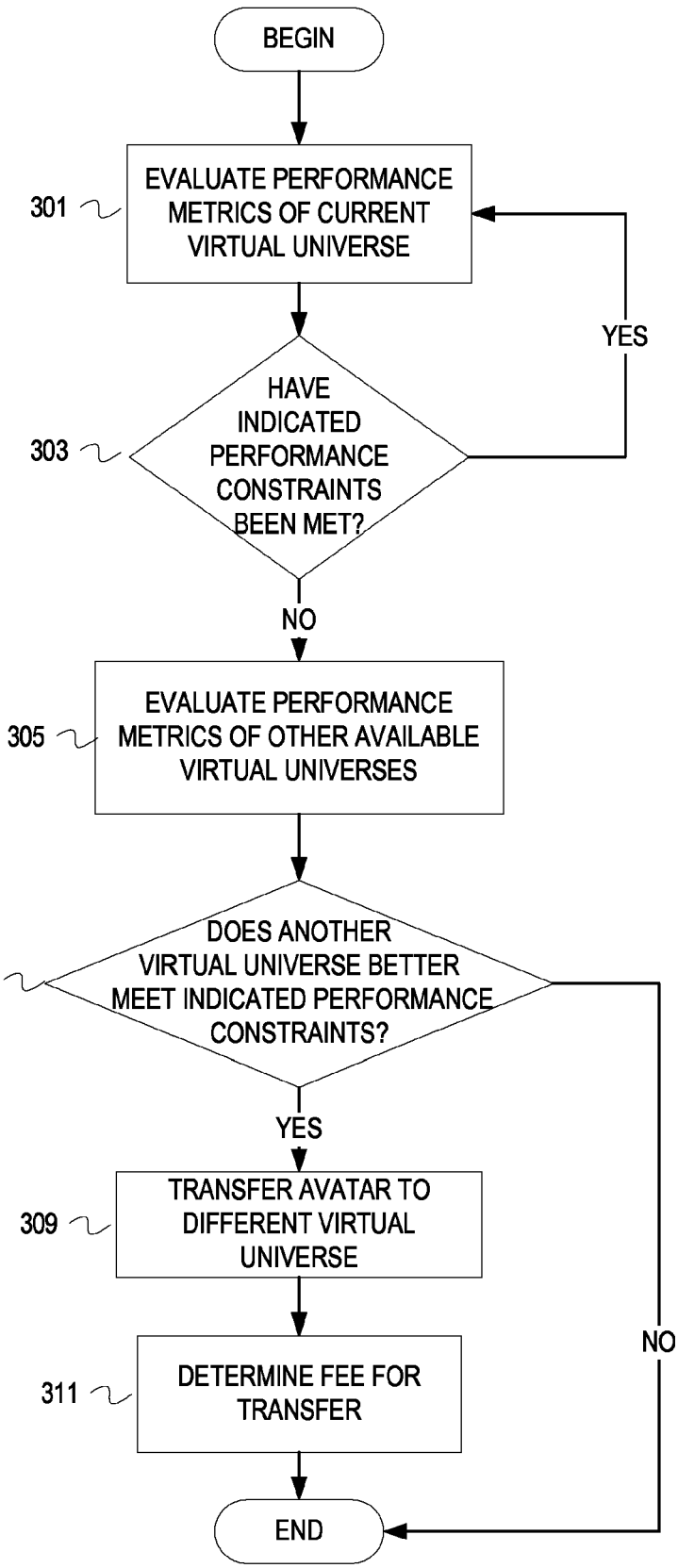
FIG. 3 is a flowchart depicting example operations to transfer an avatar from one virtual universe to another based on performance constraints.

FIG. 3 is a flowchart depicting example operations to transfer an avatar from one virtual universe to another based on performance constraints. Flow begins at block 301, where performance metrics of a current virtual universe are evaluated. The current VU is the VU in which the avatar is currently residing. In some embodiments, performance metric data is collected by an application running on a virtual universe server. In other embodiments, performance metric data is collected by an application running in the background on a client. In addition, the data may be collected continuously or at previously determined or random time intervals.

At block 303, it is determined if the performance constraints have been satisfied, at least to a given extent, by the current VU. Configurations can be set regarding failure of a VU to meet performance constraints. For example, performance constraints may be indicated for availability, spam incidence and avatar density. A configuration can be set for extent or degree of satisfaction of the performance constraints. Embodiments can determine that the current VU fails to meet performance constraints when two out of the three constraints have not been met. Satisfying performance constraints can vary in granularity. For example, it can be determined that performance constraints are satisfied if 3 of 5 performance constraints are satisfied. In another example, it can be determined that a performance constraint for packet delay is sufficiently satisfied if within 1 ms of the indicated performance constraint. If the performance constraints have been sufficiently satisfied, flow continues at block 301. If the performance constraints have not been sufficiently satisfied, flow continues at block 305.

At block 305, performance metrics of other virtual universes are evaluated.

At block 307, it is determined if another virtual universe better meets the indicated performance constraints. In some cases, a second VU that has better performance metrics than the first VU in which an avatar is currently residing may not be found. In other cases, transferring an avatar to a second VU may involve a user analyzing trade-offs between different performance metrics. If another virtual universe better meets indicated performance constraints, flow continues at block 309. If there are no other virtual universes that better meet the indicated performance constraints, flow ends.

At block 309, the avatar is transferred to a different virtual universe. The transfer may occur automatically or after a response indicating a desire to transfer by a user. In addition, more than one VU may meet the performance constraints. A user may be presented with transfer options that include any VUs that meet the performance constraints. A user may rank VUs or have transfer decisions saved with a preference to automatically select specified VUs for future transfer consideration. In some embodiments, the transfer may be temporary. For example, an avatar may be transferred back to an original VU once indicated performance metric constraints are satisfied by the original VU.

At block 311, a transfer fee is determined for transferring the avatar.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 3, the analysis of the current VU and other available VUs may occur in parallel. In addition, a transfer may occur even if the current VU is meeting performance constraints and another VU is found that better matches the constraints.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine-readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
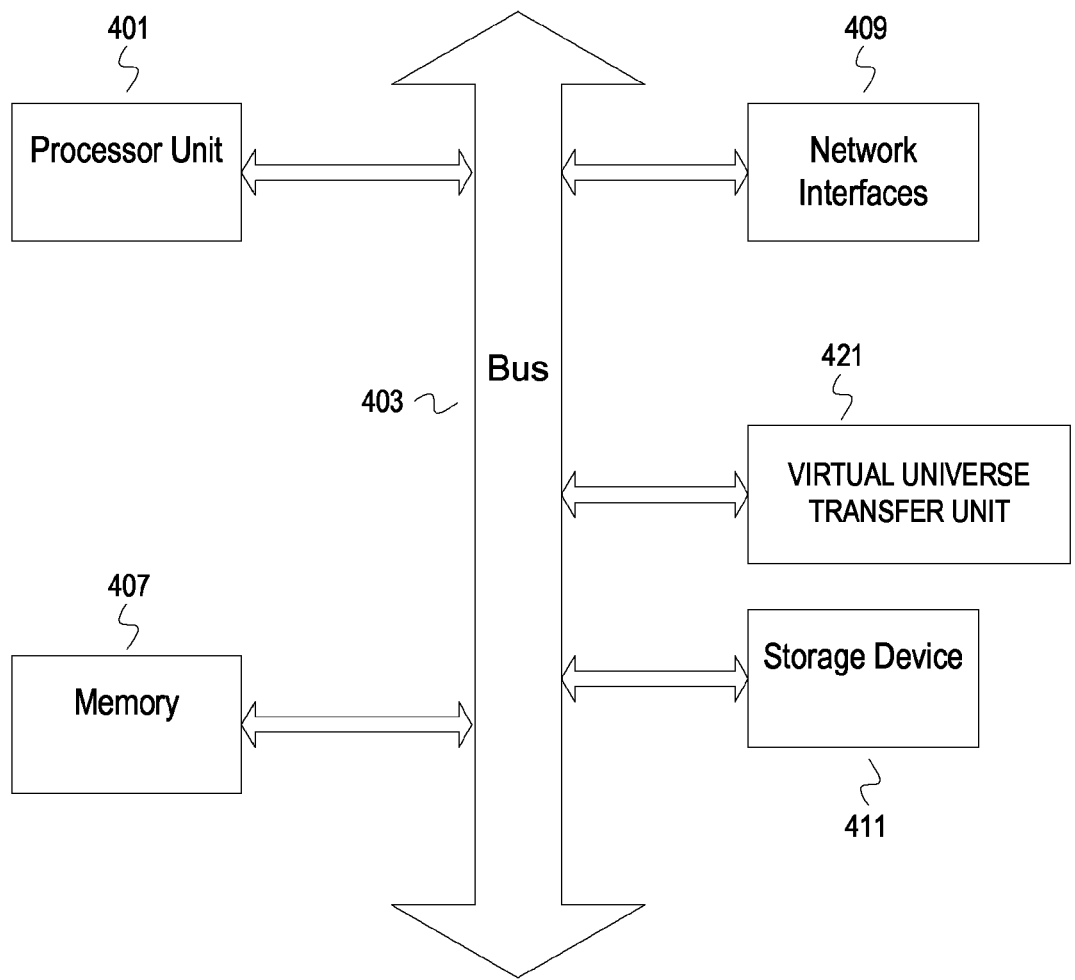
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 409 (e.g., an ATM interface, an Ethernet interface, a Frame Relay interface, SONET interface, wireless interface, etc.), and a storage device(s) 411 (e.g., optical storage, magnetic storage, etc.). The computer system includes a virtual universe transfer unit 421 that performs at least some of the above described functionality. For instance, the virtual universe transfer unit analyzes performance metrics of a plurality of VUs, selects a VU satisfying to some degree performance metric constraints, and transfers an avatar from a first virtual universe to a second virtual universe. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 411, and the network interface 409 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for transferring avatars between virtual universes as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   a machine, which is communicatively coupled with a first set of one or more servers and a second set of one or more servers, evaluating one or more performance metrics of a plurality of virtual universes against one or more indicated performance metric constraints;
   the machine selecting a first virtual universe from the plurality of virtual universes based, at least in part, on said evaluating the one or more performance metrics of the plurality of virtual universes against the one or more indicated performance metric constraints;
   transferring an avatar from the first set of one or more servers that hosts a current virtual universe of the avatar to the second set of one or more servers that hosts the first virtual universe responsive to the machine selecting the first virtual universe from the plurality of virtual universes based, at least in part, on said evaluating the one or more performance metrics against the one or more indicated performance metric constraints; and
   wherein said transferring the avatar from a current virtual universe of the avatar to the first virtual universe further comprises maintaining state data associated with the avatar from the current virtual universe to the first virtual universe.

2. The method of claim 1 further comprising predicting performance metrics of the plurality of virtual universes based at least in part on past performance metrics of the plurality of virtual universes.

3. The method of claim 1, wherein said evaluating the one or more performance metrics of the plurality of virtual universes against the one or more indicated performance metric constraints comprises determining which of the plurality of virtual universes satisfies the one or more performance constraints to a greatest degree.

4. The method of claim 1, wherein the performance metrics comprise at least one of network congestion, server load, security, level of spam, and unwanted avatar behavior.

5. The method of claim 1, further comprising:
   determining that said transferring the avatar from the current virtual universe of the avatar to the first virtual universe will result in a loss of state data; and
   resolving the loss of state data by one or more of:
      alerting the user,
      offering compensation to the user, and
      substituting state data with a default or approximately equivalent set of state data.

6. The method of claim 1 further comprising returning the avatar to the current virtual universe after a given period of time.

7. The method of claim 1, further comprising determining a fee for transferring the avatar, wherein said fee is based on at least one of a number of transfers previously requested for the avatar, a difference(s) between the current virtual universe and the first virtual universe, the first virtual universe, an amount of inventory of the avatar, and a number of avatars associated with a user account associated with the avatar being transferred.

8. A method comprising:
   a machine, which is communicatively coupled with a first set of one or more virtual universe servers and a second set of one or more virtual universe servers, evaluating one or more performance metrics of a plurality of virtual universes against one or more indicated performance metric constraints;
   selecting a first virtual universe from the plurality of virtual universes based, at least in part, on said evaluating the one or more performance metrics of the plurality of virtual universes against the one or more indicated performance metric constraints;
   transferring an avatar from the first set of virtual universe servers that hosts a current virtual universe of the avatar to the second set of virtual universe servers that host the first virtual universe; and
   maintaining state data associated with the avatar from the first set of virtual universe servers to the second set of virtual universe servers.

9. The method of claim 8, wherein said state data includes at least one of inventory items associated with the avatar, information about transactions involving the avatar, and assets belonging to the avatar.

10. The method of claim 8, wherein said maintaining the state data associated with the avatar comprises determining compatibilities between the current virtual universe and the first virtual universe.

11. A non-transitory computer program product for transferring avatars between virtual universes comprising:
    a machine-readable storage medium;
    first program instructions to evaluate one or more performance metrics of a plurality of virtual universes against one or more indicated performance metric constraints;
    second program instructions to select a first virtual universe from the plurality of virtual universes based, at least in part, on evaluating output generated by a processor executing the first instructions; and
    third program instructions to transfer an avatar from a current virtual universe of the avatar to the first virtual universe responsive to the processor executing the second instructions to select the first virtual universe based, at least in part, on the evaluation output,
    wherein the first, second, and third program instructions are stored on the machine-readable storage medium;
    wherein of the third instructions to transfer the avatar from the current virtual universe of the avatar to the first virtual universe comprises the third instructions to maintain state data associated with the avatar from the current virtual universe to the first virtual universe.

12. The computer program product of claim 11 further comprising fourth instructions to predict performance metrics of the plurality of virtual universes based at least in part on past performance metrics of the plurality of virtual universes.

13. The non-transitory computer program product of claim 11, wherein the first instructions to evaluate the one or more performance metrics of the plurality of virtual universes against the one or more indicated performance metric constraints comprises the first instructions to determine which of the plurality of virtual universes satisfies the one or more performance constraints to a greatest degree.

14. The non-transitory computer program product of claim 11 further comprising fourth instructions to prompt a user for the performance metrics constraints.

15. The non-transitory computer program product of claim 11 further comprising:
    fourth instructions to determine that the state data from the current virtual universe is not compatible in the first virtual universe; and
    fifth instructions to alert the user, offer compensation to the user, or substitute state data with a default or approximately equivalent set of state data, responsive to a processor executing the fourth instructions determining that the state data from the current virtual universe is not compatible in the first virtual universe.

16. The non-transitory computer program product of claim 11 further comprising fourth instructions to return the avatar to the current virtual universe when a first of the performance metrics of the fcurrent virtual universe satisfies a first of the performance metric constraints.

17. The non-transitory computer program product of claim 11 further comprising fourth instructions to determining a fee for transferring the avatar, wherein said fee is based on at least one of a number of transfers previously requested for the avatar, a difference(s) between the current and the first virtual universes, the first virtual universe, an amount of inventory of the avatar, a number of avatars associated with a user account associated with the avatar being transferred, and whether all avatars associated with the user account are to be transferred.

18. A computer system for transferring avatars between virtual universes, the system comprising:

a processor;

a computer readable memory and a machine-readable storage medium;

first program instructions to evaluate one or more performance metrics of a plurality of virtual universes against one or more indicated performance metric constraints;

second program instructions to select a first virtual universe from the plurality of virtual universes based, at least in part, on evaluation output generated by a first of the set of processing units executing the first instructions; and third program instructions to transfer an avatar from a current virtual universe of the avatar to the first virtual universe selected by execution of the second program instructions, where the first, second, and third program instructions are stored on the machine-readable storage medium for execution by the processor via the computer readable memory.

19. The system of claim 18 further comprising a second machine-readable storage medium that hosts data about virtual universe performance metrics.

* * * * *